(12) United States Patent
Buening et al.

(10) Patent No.: US 6,864,667 B2
(45) Date of Patent: Mar. 8, 2005

(54) STATOR WINDING PATTERN FOR REDUCED MAGNETIC NOISE

(75) Inventors: Duane Joseph Buening, Anderson, IN (US); Ronald John Krefta, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/765,184

(22) Filed: Jan. 18, 2001

(65) Prior Publication Data

US 2002/0093266 A1 Jul. 18, 2002

(51) Int. Cl.$^7$ ................................................. H20P 9/00
(52) U.S. Cl. ........................ 322/90; 310/179; 310/184; 310/180; 322/62; 322/63
(58) Field of Search ................. 310/198, 180, 310/179, 184; 322/90, 62

(56) References Cited

U.S. PATENT DOCUMENTS

| | | | | |
|---|---|---|---|---|
| 3,697,842 A | * | 10/1972 | Morrill | 318/221 |
| 4,097,754 A | | 6/1978 | Farr | 310/67 R |
| 4,163,187 A | * | 7/1979 | Thomas | 322/29 |
| 4,609,862 A | | 9/1986 | Becker et al. | 322/90 |
| 4,947,072 A | * | 8/1990 | Watkins | 310/179 |
| 5,122,705 A | | 6/1992 | Kusase et al. | 310/68 D |
| 5,274,322 A | * | 12/1993 | Hayashi | 322/90 |
| 5,376,851 A | * | 12/1994 | Lipo | 310/179 |
| 5,382,862 A | | 1/1995 | Ward et al. | 310/263 |
| 5,449,962 A | * | 9/1995 | Shishijyo | 310/184 |
| 5,455,500 A | * | 10/1995 | Shishijyo | 322/90 |
| 5,459,385 A | * | 10/1995 | Lipo | 318/701 |
| 5,691,590 A | | 11/1997 | Kawai et al. | 310/180 |
| 5,994,802 A | * | 11/1999 | Shichijyo | 310/51 |
| 6,057,622 A | * | 5/2000 | Hsu | 310/191 |
| 6,285,104 B1 | * | 9/2001 | Nashiki | 310/184 |

FOREIGN PATENT DOCUMENTS

| | | |
|---|---|---|
| JP | 06284614 | 7/1994 |
| JP | 09117085 | 2/1997 |

OTHER PUBLICATIONS

Robert Rosengerg.August Hand Electric Motor Repai third edition Saunders Collage Publishing Illustration p. 164, Fig.3–99 and the Apendix Study Question "Three phase Motor "p. 115,116,117,118.*

* cited by examiner

Primary Examiner—Nicholas Ponomarenko
Assistant Examiner—Iraj A. Mohandesdi
(74) Attorney, Agent, or Firm—Jimmy L. Funke

(57) ABSTRACT

An electrical generator having a stator, a rotor, two windings, and a rectifying circuit. The stator has a first winding arranged in a wye configuration and a second winding arranged in a delta configuration. The wye winding is wound in a full pitch pattern around three stator teeth while the delta winding is wound in a short pitch pattern around two stator teeth, or vice versa. The wye and delta windings are connected to a single bridge rectifying circuit.

17 Claims, 3 Drawing Sheets

STATOR WINDING PATTERN FOR REDUCED MAGNETIC NOISE

TECHNICAL FIELD

The present invention relates generally to electric motors, alternators or generators, and, more particularly, to a winding pattern for use in the stator of an electric motor, alternator or generator.

BACKGROUND OF THE INVENTION

Generators are found in virtually every motor vehicle manufactured today. These generators, also referred to as alternators, produce the electricity necessary to power a vehicle's electrical accessories and charge a vehicle's battery. Generators must produce electricity in sufficient quantities to power a vehicle's electrical system. Furthermore, generators must produce electricity having the characteristics necessary to be compatible with a vehicle's electrical components.

A generator includes a stator and a rotor, as seen by reference to U.S. Pat. No. 5,382,862 to Ward et al. In most generators, the stator consists of a metallic core and a current-carrying winding or windings in which electromotive force is induced by a changing magnetic flux. Typically, the core is an annular shaped structure. The internal circumference of the stator is formed with multiple tooth shaped protrusions separated by slots. The current carrying winding, which typically consists of several strands of wire and typically which has three phases, is inserted into the slots and wound around the teeth of the stator.

The generator rotor also typically consists of a metallic core and a current-carrying winding. The rotor current carrying winding typically is made of a single wire wound around the metallic core. The metallic core may be formed with a plurality of claw shaped poles. The poles are situated in pairs such that a pole originating from one end of the core is positioned next to a pole originating from the opposite end of the core. The rotor is rotatably supported at its ends, for example, by bearings installed in the generator housing. The rotor is disposed inside the stator such that the rotor rotates within the annular shaped stator.

Under normal operation, the winding of the rotor is supplied with a current, which induces a magnetic flux in each of the rotor poles. As the rotor rotates, the flux generated at the poles cuts through the current carrying winding of the stator, generating alternating current in it. The alternating current generated in the stator current-carrying winding passes through rectifying circuitry before it is introduced into the electrical system of the vehicle.

The winding pattern of the stator winding and the configuration of stator teeth and slots are significant factors in the generator's operating characteristics. Generator stators typically have one set of current carrying windings, but can have two or more stator windings. Each winding may consist of multiple coils each corresponding to a respective electrical phase p, of which there are typically three. Wires that make up the stator windings are wound into the slots between adjacent stator teeth. Typically, the wire is wound around the stator teeth several times such that bundles of wire are disposed in each slot. The number of stator teeth around which the wire is wound is referred to as the pitch. The windings are typically wound around three stator teeth, which is called a full pitch pattern, and which encompasses 180 electrical degrees. A short pitch pattern is one where the windings are wound around two teeth, and which encompasses something less than 180 electrical degrees. In a full pitch pattern, the wire is guided into a first stator slot, passed over the two slots adjacent to the first stator slot and guided into the fourth stator slot.

As mentioned above, alternating current is generated in the stator windings. Because the vehicle's accessories require direct current, the alternating current generated in the windings must be converted to direct current. The conversion from alternating current to direct current is performed by rectifying circuitry which may include a series of diodes and other electrical circuit elements that are interconnected in a circuit called a bridge. The coils (e.g., coil A, coil B, and coil C for a three-phase stator winding) are conventionally arranged in either a delta or wye configuration.

It is known to construct a generator with two stator windings, as seen by reference to U.S. Pat. No. 5,691,590 to Kawai et al. In dual stator winding generators, the two stator windings are typically spaced from each other in relation to the stator core so that they are wound around different sets of teeth rather than the same sets of teeth. Kawai et al. further disclose that one of the pair of stator windings is offset from the other one of the pair, such that the electricity generated in each winding is shifted in phase by a number of electrical rotational degrees proportional to the distance by which they are offset. Accordingly, Kawai et al. further disclose that two bridge (rectifying) circuits are required, one for each stator winding.

The result of having two bridge circuits is an increase in the number of slots in the stator. Typically, in a two winding stator, if one winding is connected in a wye configuration, then the other is also connected in a wye configuration. Likewise, if one winding is connected in a delta configuration, then the other is also connected in a delta configuration. Therefore, generators with two windings typically include either two wye bridge circuits, or two delta bridge circuits.

Another important design aspect of the stator is the configuration of the stator slots into which the magnetic wire is wound. The number of slots that a stator must have is dependent on the number of rotor pole pairs, n, and the number of electrical phases, p. For a generator having two delta or wye bridges, the number of stator slots is equal to $4 \times m \times n \times p$, where m is a positive integer, n is the number of rotor pole pairs, and p is the number of electrical phases. Therefore, a generator having two wye or two delta rectifier circuits, six pole pairs, and three phases will require a stator that has 72 slots. There are several disadvantages with conventional generators.

One disadvantage of generators of the type having a single, three-phase stator winding is that they exhibit a significant level of magnetic noise. The addition of a second three-phase stator winding wound around three teeth, without doubling the number of slots/teeth, does not reduce the noise.

Another disadvantage pertains to generators of the type having multiple stator windings. In particular, while doubling the number of stator teeth and adding a second three-phase winding may be effective in reducing magnetic noise, it also increases the number of stator teeth. Stators with an increased number of teeth are more difficult and expensive to manufacture than a stator with fewer teeth.

Still another disadvantage associated with the generators of the type having a stator with two delta windings or two wye windings, is that they require two bridge rectifying circuits, such as disclosed in Kawai et al. referred to above. Two rectifying bridge circuits result in a generator that is more costly and complex than a generator with a single bridge rectifier.

There is therefore a need for a generator that minimizes or eliminates one or more of the problems set forth above.

SUMMARY OF THE INVENTION

One object of the present invention is to provide a generator that solves one or more of the above problems set forth above. The present invention provides a novel stator winding pattern through a combination of a first stator winding wound in a full pitch pattern (e.g., around three stator teeth) and a second stator winding wound in a short pitch pattern (e.g., around two stator teeth). The stator is formed with 2×n×p slots, where n is the number of rotor pole pairs and p is the number of phases per winding, which is reduced relative to conventional multiple stator winding generators. In a preferred embodiment, one of the windings is arranged in a wye configuration and the other winding is arranged in a delta configuration. The two windings are offset from each other such that they do not begin and end in the same slots of the stator. The wire size and the number of turns for the wye and delta windings are selected so that the magnitudes of the current generated are approximately the same for both winding sets.

In the operation of a preferred embodiment, the phase voltages and phase currents generated from the short pitch winding are shifted 30 electrical degrees from the full pitch winding voltages and currents due to the winding space offset and difference in pitch. Although the phase voltages and currents are displaced 30 electrical degrees between the windings, their line currents are in phase due to the difference in the delta and wye connections. Therefore, both winding sets may be connected to the same rectifying diode bridge. The stator can be wound with either the delta or wye as the full pitch winding and the other as the short pitch winding. Two delta or two wye windings can alternatively be used, but individual rectifying diode bridges will be required to reduce or eliminate the internal circulating currents since the line currents will be out of phase.

A generator with the proposed stator winding pattern generates electricity while creating less torque ripple than a machine with a conventionally wound stator. Since torque ripple (or variation in drive torque) is a major contributor to generator magnetic noise, a reduction in torque ripple produces lower noise levels and mechanical vibrations. In addition, a generator according to the invention having the inventive stator winding pattern and single bridge rectifier circuit results in a less costly, less complex, and more easily manufactured generator compared to conventional generator configurations.

Other features and advantages will be apparent to those of ordinary skill in the art from the detailed description and accompanying drawings describing and illustrating the invention by way of example only and not by way of limitation.

BRIEF DESCRIPTION OF THE DRAWINGS

The operative features of the present invention are explained in more detail with reference to the drawings in which.

DESCRIPTION OF THE PREFERRED EMBODIMENT

Figure 1:
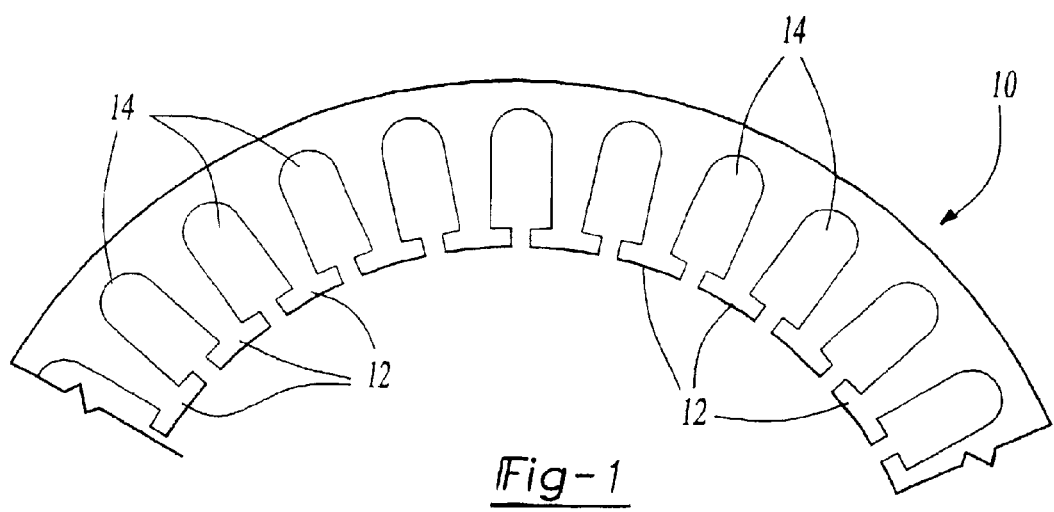
FIG. 1 shows a front perspective view of a stator with which the present invention is used.

Referring now to the drawings, as is shown in FIG. 1, stator 10 has a generally annular shaped body portion with a plurality of radially, inwardly extending teeth 12 defining a plurality of slots 14. Each slot 14 has a radially outermost, closed end as well as a radially innermost, open end. The number of slots 14 in stator 10 is selected to be, and is dependent on, the number of rotor pole pairs n and the number of electrical phases p. In a preferred embodiment, the number of slots 14 in stator 10 is equal to 2×n×p, where n is the number of rotor pole pairs and p is the number of phases. In one embodiment, the number of rotor pole pairs is six yielding a total of 36 slots. This total number of teeth for a dual stator winding type generator is reduced relative to conventional generator configurations known in the art, which may have 72 slots for a three-phase, six pole, two stator winding generator. This reduced number of teeth reduces manufacturing cost/complexity, also resulting in a reduced cost product. A generator having a stator 10 wound according to the invention may be used in an automotive vehicle.

Figures 2A, 2B:
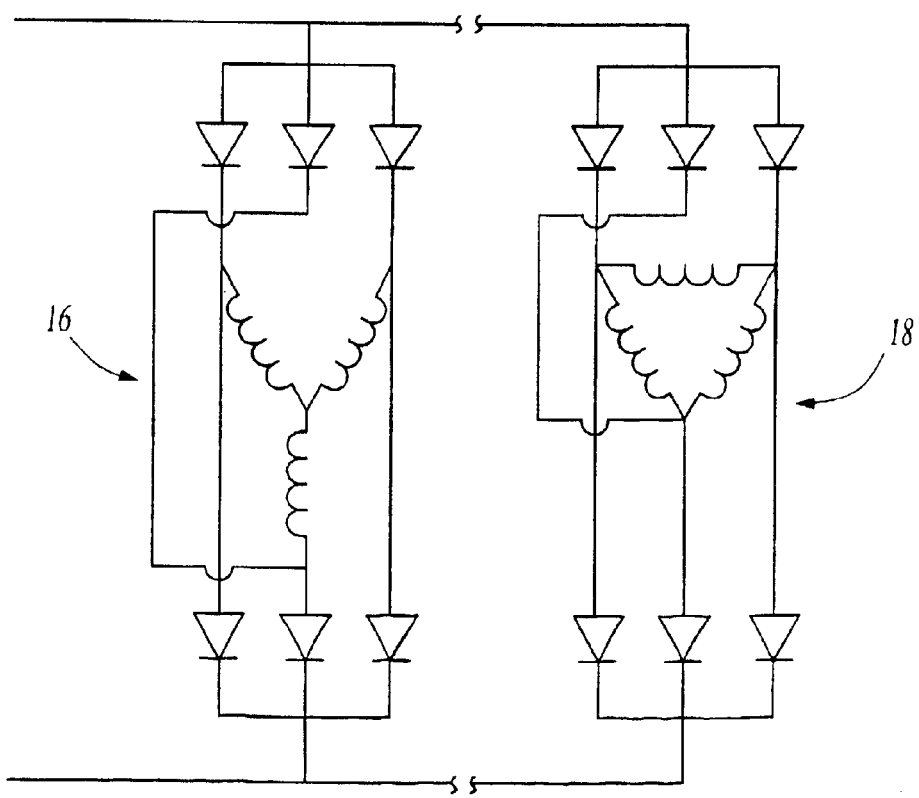
FIG. 2A shows a schematic view of a wye winding.
FIG. 2B shows a schematic view of a delta winding.

As shown in FIGS. 2A and 2B, which is a schematic circuit diagram of a three-phase winding, the present invention makes use of a three-phase wye winding 16 and a three-phase delta winding 18, each of which are well known in the art.

Figure 3A:
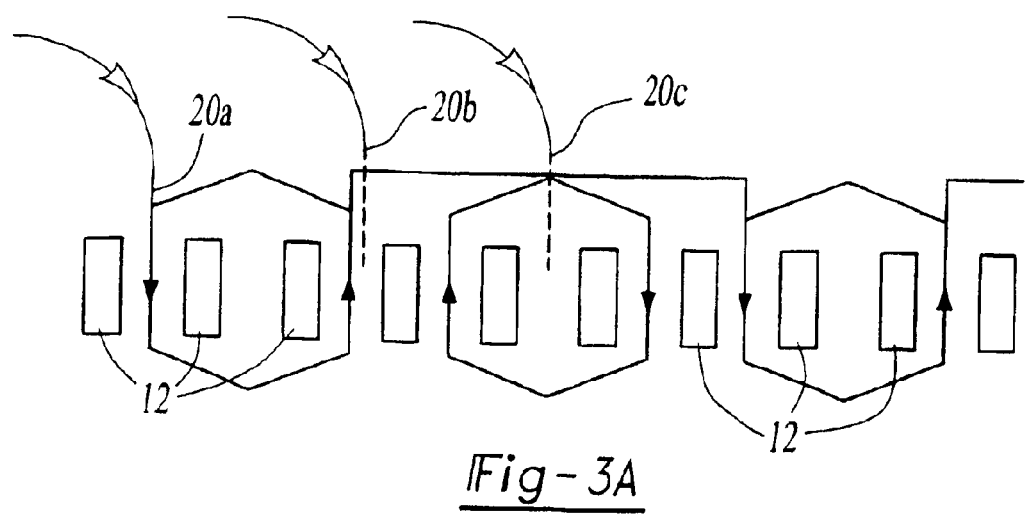
FIGS. 3A and 3B shows the winding pattern of the present invention.

In FIG. 3A, coils 20a, 20b and 20c forming a first stator winding (preferably a delta configuration) are wound in a short pitch pattern. Stator coil 20a corresponds to a first phase (Phase A) of the three phases of the delta configured winding, coil 20b corresponds to a second phase (Phase B), and coil 20c corresponds to a third phase (Phase C). The coils 20a, 20b and 20c are arranged to form a three-phase delta configured stator winding. As illustrated, coil 20a (for phase A of the first stator winding) encompasses or otherwise surrounds two teeth (one slot). As further illustrated, the initial turns of coil 20a are in a counter-clockwise orientation. Coil 20a is then wound on a next group of two teeth (one slot) offset one tooth from the first group, but wound in a clockwise orientation. As further illustrated, coil 20a is then wound around a third group of two teeth (one slot) offset one tooth from the second group, again in a counterclockwise orientation. This arrangement (i.e., counterclockwise, then clockwise, then counterclockwise, with a skipped tooth between groups) may be repeated for the remainder of the available slots 14. The stator coil 20b (for phase B of the first stator winding) is started in the second slot over or offset from the slot where coil 20a started. Coil 20b may be wound in the same counterclockwise/clockwise manner as coil 20a. Coil 20c for phase C is started in the second slot over or offset from the slot where coil 20b started, and may also follow the same counterclockwise/clockwise manner as coils 20a and 20b.

Figure 3B:
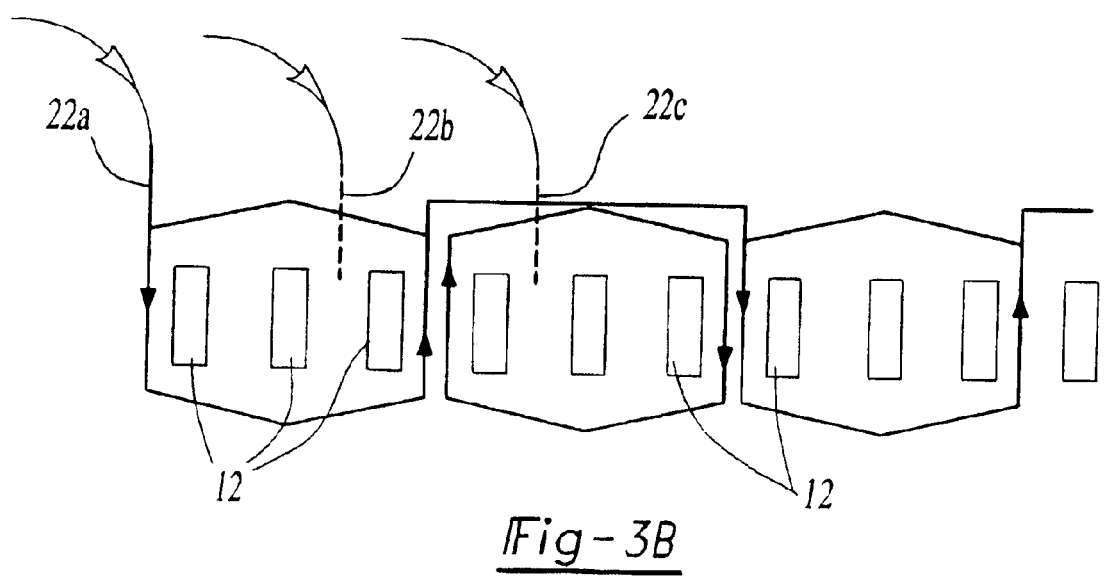

Referring now to FIG. 3B, stator coils 22a, 22b and 22c forming a second stator winding (preferably a wye configuration) are wound in a full pitch pattern. Stator coil 22a corresponds to a first phase (phase A) of the second stator winding, coil 22b corresponds to a second phase (phase B), and coil 22c corresponds to a third phase (phase C). The coils 22a, 22b and 22c are grouped to form a three-phase winding arranged in a wye configuration. Stator coil 22a encompasses three teeth (two slots). As illustrated, the initial turns of coil 22a are in a counterclockwise orientation. Coil 22a is then, as illustrated, wound on the next group of three teeth (two slots) immediately adjacent to the first group, but is wound in a clockwise orientation. As further illustrated, stator coil 22a is then wound on the immediately adjacent group of three teeth (two slots), again in a counterclockwise orientation. This arrangement may be repeated for the remainder of the available slots 14. The stator coil 22b for phase B is started in the second slot over or offset from the slot where coil 22a started. Coil 22b may be wound in the same counterclockwise/clockwise manner as coil 22a. Coil 22c for phase C is started in the second slot over or offset from the slot where coil 22b started, and may also follow the same counterclockwise/clockwise manner as coils 22a and 22b.

In one embodiment, approximately the first one-half of the slot area is taken up with conductors corresponding to the full pitch winding pattern (e.g., the wye-configured stator winding 16 in a preferred embodiment), the remaining half of the area of the slot being taken up with conductors corresponding to the short pitch winding pattern (e.g., the delta-configured stator winding 18 in a preferred embodiment). It should be understood, however, that this orientation may be reversed.

An exemplary construction process will now be described. In one embodiment, coil 22a may be wound first into the slots 14 (i.e., in the radially outermost position adjacent to the closed end of the slots), with coils 22b and 22c, respectively, being wound progressively radially inwardly thereof, filling the slot toward the center of the stator. The insertion of the full pitch pattern windings may be followed by the short pitch pattern windings. In this regard, coil 20a is wound into the slots after coil 22c, with coils 20b and 20c, respectively, being wound radially inwardly thereof towards the open end of the slot to fill the remaining area. As known, the distal ends of the stator teeth may be rolled over or the like to aid in retaining the windings.

It should be understood that whatever approach is taken in the actual construction of the coil for phase A, that the coils for phases B and C would be wound in a similar fashion. This principal applies to both stator windings (i.e., the full pitch pattern and the short pitch pattern).

In the illustrated embodiment, the two stator windings are overlaid on the same stator, but are, effectively, offset by 30 electrical degrees due to the pitch difference, which shifts the generated phase currents by the same angle. More generally, the offset is governed by the following equation: offset (degrees electrical)=90/p where p is the number of electrical phases. The generator line currents are kept in phase due to use of one wye winding and one delta winding. Due to the difference in the winding patterns, the windings effectively end up a half slot apart, which shifts the generated phase currents by an electrical angle proportional to the offset, 30°, while keeping the line current and voltage in phase. This is so since one side of the winding coils are in the same slot (i.e., they start together) while the other side of the coils end up one slot apart thereby placing the windings effectively a half slot apart.

In an alternative embodiment, the three-phase wye winding could be wound in a short pitch pattern around two stator teeth and the three-phase delta winding wound in a full pitch pattern around three stator teeth. The number of slots required for this embodiment is also 2×n×p.

The wire size and number of turns for the three-phase wye winding 16 and the three-phase delta winding 18 may vary. The sizes and the number of turns of the windings are selected so that the magnitudes of line voltage and line current are approximately the same for both winding sets. For example, in one embodiment, the number of turns for the delta winding 18 is about twice the number of turns of the wye winding 16, to thereby better match the electromotive force (EMF) outputs.

Figure 4:
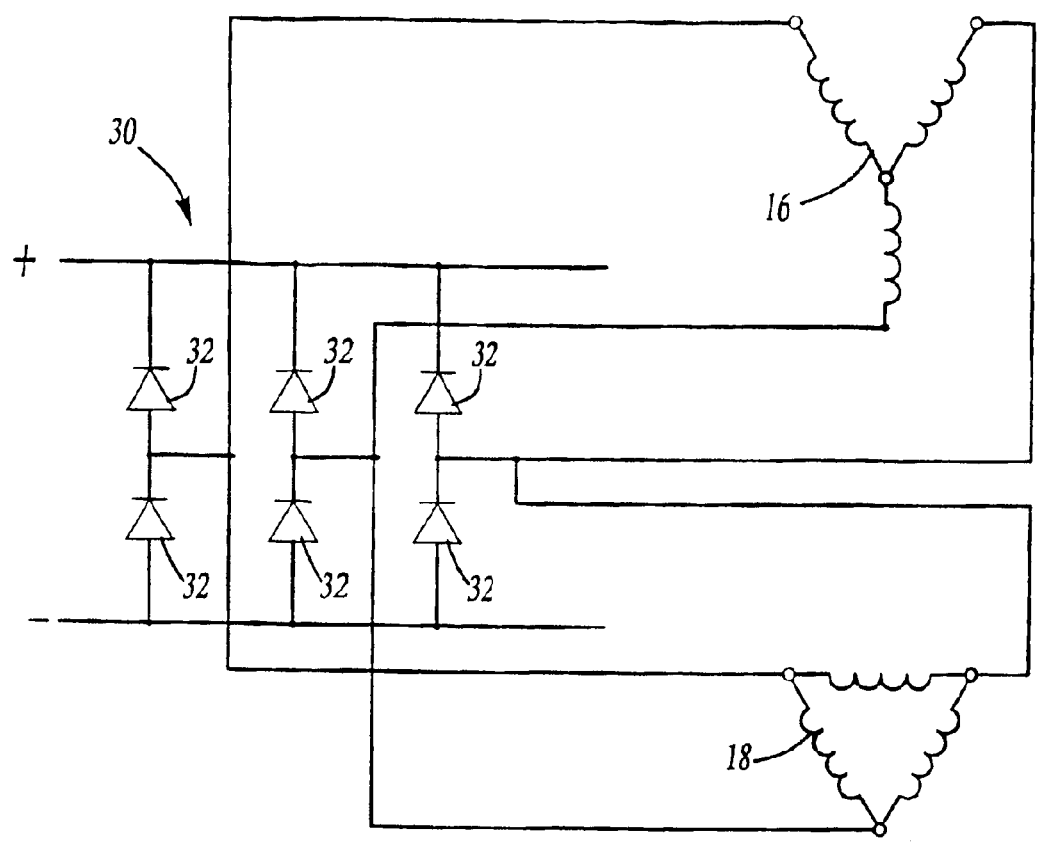
FIG. 4 shows a schematic view of the present invention's rectifying bridge circuitry.

FIG. 4 is a simplified schematic diagram view of a rectifier bridge coupled to the dual stator windings of the illustrated embodiment. A further advantage obtained by the present invention, in addition to reducing the number of slots for a dual stator winding configuration (i.e., maintain the same number of slots as for a single stator winding configuration while reducing magnetic noise) is that only a single rectifying circuit is required, thereby simplifying the construction. As can be seen, wye winding 16 and delta winding 18 are arranged in parallel and are connected to rectifier bridge 30. As known in the art, bridge 30 may comprises a plurality of diodes 32, among other known components.

The foregoing disclosure is intended merely to illustrate certain preferred embodiments of the invention. It is contemplated that those skilled in the art may find numerous ways to modify these embodiments without departing from the scope and spirit of the invention. As such, the scope of the invention is defined by the appended claims and not by the details of the specification.

What is claimed is:

1. An alternating current (AC) generator comprising a stator and a rotor, said rotor comprising a plurality of pole pairs, said stator comprising a first multi-phase system wound in a full pitch pattern with at least one complete loop surrounding a first predetermined number of teeth of said stator and a second multi-phase system wound in a short pitch pattern with at least one complete loop surrounding an adjacent second predetermined number of said teeth, said first predetermined number being different than said second predetermined number.

2. The generator of claim 1 wherein said first and second multi-phase systems are three-phase systems.

3. The generator of claim 1 wherein said first and second multi-phase systems are physically offset one relative to another.

4. The generator of claim 3 wherein said first system is wound in one of a delta and a wye configuration and said second system is wound in the other one of said delta and wye configuration.

5. The generator of claim 4 wherein said full pitch pattern is wound in said wye configuration and said short pitch pattern is wound in said delta configuration.

6. A stator for an alternating current generator, said generator having a rotor with poles, comprising:
  a substantially annular body portion;
  a plurality of teeth extending radially inwardly from said annular body portion;
  a plurality of slots defined between said teeth;
  at least two multi-phase systems wound around said teeth and inserted into said slots,
  wherein the number of stator slots is equal to 2×n×p, where p is the number of electrical phases per system, and n is the number of rotor pole pairs, and
  wherein a first one of said systems being wound in a full pitch pattern with at least one complete loop surrounding a first predetermined number of teeth of said stator and a second one of said systems being wound in a short pitch pattern with at least one complete loop surrounding an adjacent second predetermined number of said teeth, said first predetermined number being different than said second predetermined number.

7. The stator of claim 6 wherein said systems are three-phase systems.

8. The stator of claim 6 wherein one of said first and second systems is wound in a wye configuration and the other one of said first and second systems is wound in a delta configuration.

9. The stator of claim 8 wherein said first and second systems are positionally shifted from each other by an electrical angle of 30 degrees.

10. The stator of claim 6 wherein said first and second systems are connected to a rectifier bridge.

11. A stator for an alternating current generator comprising at least a pair of multi-phase systems, one of the systems being a wye type system and the other one of the systems being a delta type system wherein one of the systems is a full pitch system with at least one complete loop surrounding a first predetermined number of teeth of said stator and the other one of the systems is a short pitch system with at least one complete loop surrounding an adjacent second predetermined number of said teeth, said first predetermined number being different than said second predetermined number.

12. The stator of claim 11 wherein said systems are connected to the same rectifier bridge.

13. The stator of claim 12 wherein one of the systems is a full pitch system and the other one of the systems is a short pitch system.

14. The stator of claim 11 wherein said systems are offset according to the equation $\frac{90}{p}$ where the offset is in degrees (electrical) and p is the number of electrical phases per system.

15. The stator of claim 14 wherein the offset is 30 degrees (electrical) for a pair of p=3 phase systems.

16. The stator of claim 11 comprising 2×n×p slots wherein p is tho number of electrical phases per system and n is the number of rotor pole pairs.

17. The stator of claim 11 further comprising a plurality of teeth defining a plurality of slots.

* * * * *